(12) United States Patent
Yau

(10) Patent No.: US 9,210,133 B2
(45) Date of Patent: *Dec. 8, 2015

(54) METHOD AND SYSTEM OF PROVIDING AUTHENTICATION OF USER ACCESS TO A COMPUTER RESOURCE VIA A MOBILE DEVICE USING MULTIPLE SEPARATE SECURITY FACTORS

(71) Applicant: HOVERKEY LTD., London (GB)

(72) Inventor: Arnold Yau, London (GB)

(73) Assignee: HOVERKEY LTD., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,727

(22) Filed: Feb. 6, 2014

(65) Prior Publication Data
US 2014/0156993 A1 Jun. 5, 2014

Related U.S. Application Data

(63) Continuation of application No. 14/091,183, filed on Nov. 26, 2013, which is a continuation-in-part of application No. 13/706,307, filed on Dec. 5, 2012.

(30) Foreign Application Priority Data

Nov. 28, 2012 (GB) .................................. 1221433.4
Mar. 1, 2013 (GB) .................................. 1303677.7

(51) Int. Cl.
*G06F 21/00* (2013.01)
*H04L 29/06* (2006.01)
(Continued)

(52) U.S. Cl.
CPC ............ *H04L 63/0428* (2013.01); *G06F 21/34* (2013.01); *G06F 21/445* (2013.01);
(Continued)

(58) Field of Classification Search
CPC .............................. H04L 9/321; H04L 9/3213
USPC ...................... 726/8–10, 26–27; 713/182–185
See application file for complete search history.

(56) References Cited

U.S. PATENT DOCUMENTS 8,539,233 B2 * 9/2013 Dubhashi et al. ............. 713/168
2003/0028653 A1 2/2003 New et al.
(Continued)

FOREIGN PATENT DOCUMENTS

GB            2 476 989 A     7/2011
WO     WO 2012/103584 A1    8/2012

OTHER PUBLICATIONS

Aloul et al. "Two factor authentication using mobile phones" Computer Systems and Applications, 2009. AICCSA 2009. IEEE/ACS International Conference on pp. 641-644.*

(Continued)

*Primary Examiner* — Roderick Tolentino
(74) *Attorney, Agent, or Firm* — Hickman Palermo Becker Bingham LLP

(57) ABSTRACT

A method and system of authenticating a computer resource such as an application or data on a mobile device uses a contactless token to provide multi-factor user authentication. User credentials are stored on the token in the form of private keys, and encrypted data and passwords are stored on the device. When application user requires access to the resource an encrypted password is transmitted to and decrypted on the token using a stored private key. An unencrypted data encryption key or password is then transmitted back to the device under the protection of a cryptographic session key which is generated as a result of strong mutual authentication between the device and the token.

27 Claims, 11 Drawing Sheets

(51) Int. Cl.
 H04L 9/32      (2006.01)
 G06F 21/34     (2013.01)
 G06F 21/44     (2013.01)
 H04W 12/06     (2009.01)
 H04L 9/06      (2006.01)

(52) U.S. Cl.
 CPC ............ *H04L9/3213* (2013.01); *H04L 9/3226* (2013.01); *H04L 63/083* (2013.01); *H04L 63/0807* (2013.01); *H04L 63/0869* (2013.01); *H04L 63/18* (2013.01); *H04W 12/06* (2013.01); *H04L 9/0637* (2013.01); *H04L 2463/082* (2013.01)

(56) References Cited

U.S. PATENT DOCUMENTS

| | | | | |
|---|---|---|---|---|
| 2005/0044398 | A1* | 2/2005 | Ballinger et al. | 713/200 |
| 2008/0209225 | A1 | 8/2008 | Lord et al. | |
| 2008/0289030 | A1 | 11/2008 | Poplett | |
| 2009/0092253 | A1* | 4/2009 | Asipov et al. | 380/278 |
| 2010/0211507 | A1 | 8/2010 | Aabye et al. | |
| 2010/0241867 | A1* | 9/2010 | Brown et al. | 713/185 |
| 2011/0117966 | A1 | 5/2011 | Coppinger | |
| 2011/0142234 | A1* | 6/2011 | Rogers | 380/247 |
| 2011/0320802 | A1* | 12/2011 | Wang et al. | 713/2 |
| 2012/0117636 | A1* | 5/2012 | Adams | 726/9 |
| 2012/0272307 | A1* | 10/2012 | Buer | 726/9 |
| 2013/0024424 | A1* | 1/2013 | Prahlad et al. | 707/640 |
| 2013/0198826 | A1* | 8/2013 | Waldron | 726/6 |
| 2013/0214902 | A1 | 8/2013 | Pineau et al. | |
| 2014/0149746 | A1 | 5/2014 | Yau | |

OTHER PUBLICATIONS

Liou et al., "A feasible and cost effective two-factor authentication for online transactions" Software Engineering and Data Mining (SEDM), 2010 2nd International Conference on pp. 47-51.*

A. Nicholson, "Mobile Device Security Using Transient Authentication", IEEE Trans. on Mobile Computing 5:11 (Nov. 2006) at 1489, 14 pages, published in US.

U.S. Appl. No. 13/706,307, filed Dec. 5, 2012, Notice of Allowance, Mar. 26, 2015.

Menezes et al., "Handbook of Applied Cryptography", dated 1998, CRC Press LLC, USA, 32 pages.

European Patent Office, "Search Report" in application No. PCT/GB2013/053138, dated Apr. 23, 2015, 12 pages.

* cited by examiner

METHOD AND SYSTEM OF PROVIDING AUTHENTICATION OF USER ACCESS TO A COMPUTER RESOURCE VIA A MOBILE DEVICE USING MULTIPLE SEPARATE SECURITY FACTORS

BENEFIT CLAIM

This application claims the benefit under 35 U.S.C. 120 as a Continuation of application Ser. No. 14/091,183, filed Nov. 26, 2013, which is a Continuation-in-part of application Ser. No. 13/706,307, filed Dec. 5, 2012, and which claims the benefit under 35 U.S.C. 119 of Great Britain application GB 1221433.4, filed Nov. 28, 2012, and Great Britain application GB 1303677.7, filed Mar. 1, 2013 and granted as GB 2496354.

1. INTRODUCTION

The present application relates to a method and system of authenticating a user to a computer resource accessed via a mobile device using a portable security token (for example a contactless smart card or bracelet), together with a secret that the user can easily remember (for example a PIN code). This secret provides a second, separate preferably independent security factor that can safeguard the computer resource even if the portable security token and the mobile device are both lost or stolen together. A preferred embodiment relates to providing data protection and secure access to applications and stored data accessed via a mobile device (such as a phone or tablet) using a near-field communication (NFC) hardware token or a short range Bluetooth token.

Secure authentication of a user via a mobile device is becoming important in two different situations, firstly for authentication of user access to a computer resource on the mobile device and secondly on a remote server.

Most existing systems employ the use of a simple password or PIN to authenticate the user. Despite the ubiquity of password-based systems, it has many problems. An ideal password needs to be easily remembered by the user. However, in order for passwords to be secure, they should be long and hard to predict, contradictory to the former requirement. This is further exacerbated by the proliferation of passwords for the multitude of applications a user typically uses, for which security best practice recommends different passwords should be used.

In addition to application access, some mobile users wish to ensure a high level of security for data (including entire files and data contained within a file or a data structure) on their device, against a number of external threat scenarios. For example, a user may use an app on a tablet or other portable device that synchronizes files with their desktop PC via an online storage service (e.g. Dropbox, Box.com [trademarks]). Some of the downloaded files may contain confidential information such as business documents. The user wishes to safeguard himself against the possibility of a data breach in the event of theft of the device.

A practical way to achieve this today is to enable device encryption on the mobile operating system, which uses an encryption key derived from the device lock screen password. For maximum security, this password should be long and complex. However using a long and complex password as the password to unlock the lock screen is extremely inconvenient for the user.

Because of this, most users are reluctant to use any password more complicated than a 4 digit PIN code to unlock the lock screen. A skilled attacker will be able to decrypt any files stored on a stolen device with brute force attack methods. Moreover, the confidential data is decrypted whenever the device has been unlocked, even when the user is not using the data, which increases the risk of a data breach unnecessarily.

Another possible approach to data encryption is for the app to generate its own encryption key. The problem with this approach is that the key would either have to be protected by or derived from a password for security, or has to be stored within the app in plaintext form for usability. The former approach inherits the same password complexity issue as the device encryption method above, while the latter offers little security as the attacker who could compromise the plaintext data could just as easily read the plaintext key and decrypt the data. One way to provide an additional level of security to users of mobile devices is by requiring that the user also carries a wearable physical token that communicates with the device using a wireless communication system e.g. Bluetooth or Bluetooth Low Energy Bluetooth (BLE). The mobile device constantly checks for the presence of the token. This token, when present within a range of several meters of the mobile device, constantly verifies that the user is indeed present. When the user departs the token and the device lose contact and the device secures itself against any access until communication with the token is regained.

An example of such a system is described by Nicholson, Corner and Noble in IEEE Transactions on Mobile Computing, Vol 5 No 11 Nov. 2006. There are a number of disadvantages of such a system. The broadcast based communications channel between the token and the mobile device is subject to eavesdropping to an attacker who is within close range of the token and the device. Despite being encrypted, because of the numerous transient authentication events that take place between the token and the device, the attacker is presented with many opportunities to cryptanalyse the authentication messages, as well as to perform traffic analysis without even having to attempt an cryptanalytic attack A thief who steals the mobile device but still remains within range of the security token worn by the device owner will be able to access the resources on the device. Theft of the mobile device and the token together renders the security system useless.

In some other existing systems an additional level of security has been provided by requiring that an NFC or Bluetooth capable mobile phone be first authenticated to the mobile network prior to an application being executed. An NFC/Bluetooth token then provides an asymmetric key to the phone which in turn authenticates to a third-party service by performing digital signature within the phone itself.

A generic example of such a system is shown in US-A-2011/0212707. This, however, displays a number of disadvantages. In particular changing of the application credential requires re-programming or replacement of the token; the number of user credentials secured by the system is limited by the (small) storage capacity of the token; and the loss of the token poses a direct risk of exposure of the user's credentials. In addition, applications running on the mobile device and the server are capable of making use of the described security system only if they have been specifically programmed to do so. The system described cannot be used with pre-existing applications.

Another approach to multi-factor identification is described in US-A-2008/0289030. Here, a contactless token is, upon validation, used to allow access to the authentication credentials secured on the mobile device itself.

This has a number of serious disadvantages, including the necessity of using secure storage on the device. This is normally not available to application developers as it is maintained and controlled by the manufacturer of the device (e.g.

mobile phone) or the supplier of the underlying operating system or a mobile network operator. Also, making use solely of a token identifier as a means of validating the token is likely to be insecure. RFID tokens can typically be read by any compatible reader, and can easily be cloned.

Yet a further approach is described in WO-A-2011/089423. This describes a system where the presence of a contactless token is used to authorize execution of a secure function or application, and is aimed primarily at mobile wallet uses.

Again, the system described has a number of disadvantages, primarily that it uses a form of logical control that is relatively easy to circumvent.

More generally, in the enterprise environment there exists significant security risk from allowing users to connect mobile devices into the network due to increased likelihood of unauthorized data access (leading to loss of data confidentiality and/or integrity) resulting from:
- Inadvertently disclosed passcodes such as PINs or alphanumeric codes, e.g. from shoulder surfing
- Easily guessed passcodes
- Lost or stolen devices that are inadequately protected
- Unsupervized use of devices by a third party The Hoverkey system aims to provide solutions for applications to counter these threats.

With the present invention, the user may store a master key of high cryptographic strength (128 bits or above presently) on the portable security token, and this key can be used to either directly protect an app's data encryption key or a long and complex password, from which a sufficiently long and secure encryption key can be derived. This allows the user to protect any data stored on the device with a very strong encryption key. If the device is stolen, it is then infeasible for any potential attacker to decrypt the encrypted data on it without the associated token.

Credentials may be stored either on the mobile device or, remotely, in the cloud. Cloud storage preferably has the following features:
- Protected credentials are always stored in the cloud and retrieved from the cloud before use
- Transparent local caching is possible but not meant as permanent storage—should be wiped after a specified time-out period
- If device or token is lost, credentials may be removed simply by removing the relevant files from the cloud storage service to avoid potential misuse
- Credential synchronisation is possible across devices for the same user, obviating the need for manual entry of the same credentials multiple times.

2. BACKGROUND

2.1 The Invention and Preferable Features Thereof

According to the present invention there is provided a method and system of authenticating access to computer resource in a mobile device as set out in the pre-characterising portions of the independent claims. An embodiment also may provide a method and system of authentication an application running on a mobile device.

According to a first aspect of the present invention, a method of authenticating a computer resource on a mobile device comprises:
- storing an encrypted resource authorization;
- transmitting the encrypted authorization to a separate portable security token; on the token, decrypting the encrypted authorization and generating at least partially therefrom an unlock response;
- securely transmitting the unlock response to the mobile device;
- requiring a user to authenticate separately on the mobile device; and
- unlocking the resource if the required unlock response and the separate authentication are both valid.

In an embodiment, the encrypted resource authorization may be on the device. In an embodiment, the requiring step is omitted, and the unlocking is performed without consideration of separate authentication.

The unlock response may comprise a plain authorization, obtained by decrypting the decrypted authorization The unlock response may alternatively comprise a function (such as a hash) of a plain authorization, obtained by decrypting the decrypted authorization, and additional information. Thus, in one usage mode, the token may verify and decrypt the encrypted authorization. Then, instead of returning a plain authorization to the device, protected by a session or other encryption key, the token may perform some computation on the plain authorization and possibly some other information (eg token-based information), and return the result to the device. Examples include the following:

Example 1: Digital Signature: computation=digital signature function, plain authorization=private signing key; parameter=hash of message; output=digital signature on message hash Example 2: Key Derivation: computation=key derivation function; plain authorization=key derivation master secret; parameters=context information, output length; output=key derived from master secret Example 3: Re-encryption: computation=encryption function; plain authorization=encryption key; parameter=(another) encryption key; output=the plain authorization encrypted with a different key The authorization may comprise a password, PIN or cryptographic key.

The unlock response may be transmitted to the mobile device under the protection of an encryption key, such as a session key.

The token may store user/token ownership credentials, the decryption on the token being based on the user credentials.

The method provides two-factor (or multi-factor) authentication by requiring a user in addition to authenticate separately on the mobile device, for example by the authentication on the mobile device being validated on the token before the unlock code is sent. Preferably, the method requires a proof of knowledge (eg a PIN) from the device (and ultimately from the user) before decrypting the authorization. The proof may be provided after mutual authentication. Alternatively, the device authentication may be entirely independent of the token authentication.

In an embodiment, the token may operate in single factor mode, which decrypts authorization after mutual authentication with the device.

A service may be run on the mobile device which controls device cryptographic functions and access to the resource. An applet may be run on the token which provides token cryptographic functions.

The user credentials may be generated by the token and never leave the token (or the app running on the token).

Preferably, the encrypted authorization stored on the mobile device can be decrypted solely with the corresponding user credentials stored on the token.

The method may include verifying integrity on the token by a message authentication code (MAC) received from the device.

The method may include verifying the integrity of the encrypted authorization on the token prior to decryption.

The device and the token may perform cryptographic mutual authentication before transmission of the encrypted authorization.

The encryption, decryption and/or the mutual authentication may be provided by symmetric key cryptography A user secret may be passed from the device to the token and may be validated by the token before the decryption operation takes place.

The resource may comprise data, or an application running or stored on the mobile device.

According to another aspect of the invention there is provided:

a mobile device;

a token including token storage for storing private user credentials, a token communications system, and a token processor providing cryptographic functions;

and wherein in use an encrypted authorization is transmitted by the device communications system to the token; is decrypted on the token using the user credentials; the token generating at least partially therefrom an unlock response, the unlock response being securely transmitted by the token communications system to the mobile device; requiring a user to authenticate separately on the mobile device; and unlocking the resource if the required unlock response and the separate authentication are both valid.

The device communications system and the token communications system may communicate over the air, eg by Near Field Communication (NFC), Bluetooth or BLE. Alternatively, the device communications system and the token communications system may communicate only when the token is in contact with the device via a physical interface.

The device communications system may send a user secret to the token which is validated by the token before the decryption operation takes place.

The device communications system may send a message authentication code (MAC) to the token, which is validated by the token before the decryption operation takes place.

According to a further aspect of the invention, there is provided:

a hardware token for authenticating access to a computer resource via a mobile device, the token comprising:

token storage for the storage of a plurality of user credentials;

a token communications system for communicating with a mobile device;

a token processor providing cryptographic functions; and wherein, in use:

on receipt by the token communications system of an encrypted authorization, the token processor verifies the integrity and decrypts the encrypted authorization and generates at least partially therefrom an unlock response, and wherein the token communications system securely transmits the unlock response for use by a mobile device.

The preferred system of the present invention preferably comprises:

1. One or more mobile devices
2. An NFC, Bluetooth or BLE token programmed to:
    a) Be able to mutually authenticated with any of the user's devices
    b) Respond only the commands issued by any of the user's devices
    c) Perform encryption and integrity protection of data provided by the device
    d) Return the cryptographically protected data
    e) Perform the decryption and integrity verification on previously protected data
    f) Optionally require validation of a user PIN prior to performing decryption operations
3. A password manager application installed each the mobile device
4. Any number of third-party applications secured by the system The mobile device may comprise any mobile or portable hardware device which is capable of running user applications and handling communication and cryptographic functions. Typical devices include mobile phones, tablets, laptop computers and the like. The token may be any portable or mobile hardware token which is capable of communication (preferably contactless communication) with a mobile device and which includes storage and an executable system which is capable of handling communications and cryptographic functions.

The protected computer resource may be held in a device memory or store or (where an application) may be held ready for execution or may be actually running in an execution environment. To that end, the device may include a store, a memory, and a processor.

Typically, the token will be a contactless smart card, although other tokens held by or carried on the person would be equally possible. Suitable tokens might include a ring to be worn on the user's finger, a device incorporated into a watch, belt, spectacles, clothing or anything else normally worn by the user, or even a device embedded under the user's skin. The token may have button(s), touch-sensitive area(s) or other means to allow manual or other user feedback/input via the token.

The application authentication stored on the device may comprise an application password or PIN. The user credentials stored on the token may comprise a private cryptographic key.

It is preferred that communication between the token and the mobile device makes use of NFC, although other channels could equally well be used including Bluetooth, Bluetooth Low Energy (BLE), or other types of radio frequency communication. Tokens requiring contact with the mobile device, including swipe cards and electrical contactcards are also envisaged.

According to another aspect of the invention, a system of authenticating access to a computer resource on a mobile device with a portable security token comprises:

a device including a computer resource to be protected, a device communications system, and device storage for storing encrypted resource authorization;

a token including token storage for storing private user credentials, a token communications system, and a token processor providing cryptographic functions;

and wherein in use the encrypted authorization stored on the device is transmitted by the device communications system to the token, is decrypted on the token using the user credentials, the token generating at least partially therefrom an unlock response, the unlock response being securely transmitted by the token communications system to the mobile device, and the device being arranged to unlock the resource if the received unlock response is valid.

According to a further aspect of the invention, a hardware token for authenticating a computer resource on a mobile device, the token comprises:

token storage for the storage of a plurality of user credentials;

a token communications system for communicating with a mobile device;

a token processor providing cryptographic functions; and wherein, in use:
on receipt by the token communications system of an encrypted authorization, the token processor verifies the integrity and decrypts the encrypted authorization and generates at least partially therefrom an unlock response, and wherein the token communications system securely transmits the unlock response for use by a mobile device.

2.2 Hoverkey Level 1

In the preferred embodiment the present invention is preferably embodied within a product called Hoverkey. Hoverkey's design is optimised for ease of integration with existing mobile apps and web apps, as well as ease of use. It implements a secure user credential (e.g. password) storage and retrieval system, secured using NFC tokens.

The present application is particularly concerned with an embodiment that uses a specific security design, referred to in this description as "level 1". References to Hoverkey level 1 (or Hoverkey L1) should be understood accordingly.

2.2.1 Security Concept

The concept behind Hoverkey L1 is designed to work with all existing applications which authenticate the user using a user name and password combination, although authentication methods other than passwords may be used. Typically, without any changes to the application to be accessed, the technology simply replaces manual entry of the user's password with a touch of an NFC token. This embodiment offers the following advantages:

No changes required for the application server, which allows easy integration

Changes to any existing application clients can be easily implemented through the use of a Hoverkey Component.

Better security by letting technology to "remember" passwords for the user, which means The user can choose passwords that are more secure (longer and more "random")

The user can choose different password for different accounts without the fear or inconvenience of forgotten passwords Eliminates the need for entering alphanumeric passwords on an onscreen keyboard, especially when symbols are included, which is slow and error-prone and subject to shoulder-surfing attacks.

3. Overview

The invention may be carried into practice in a number of ways and one specific embodiment will now be described, by way of example, with reference to the accompanying drawings, in which.

Figure 5A:
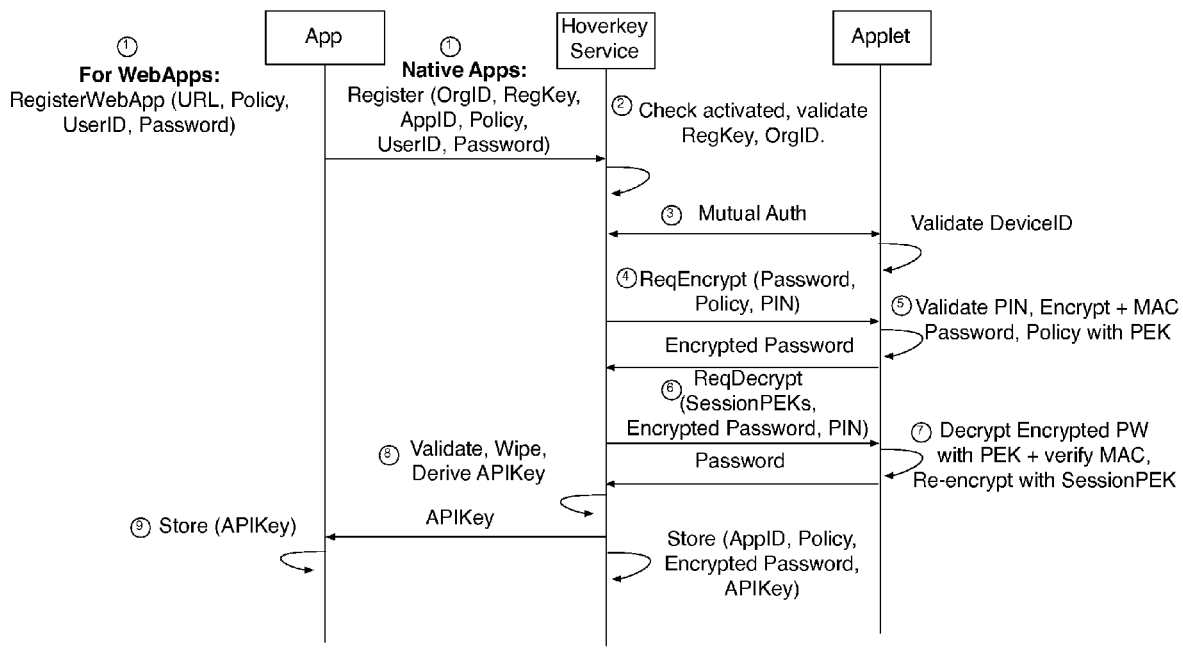
Figure 5B:
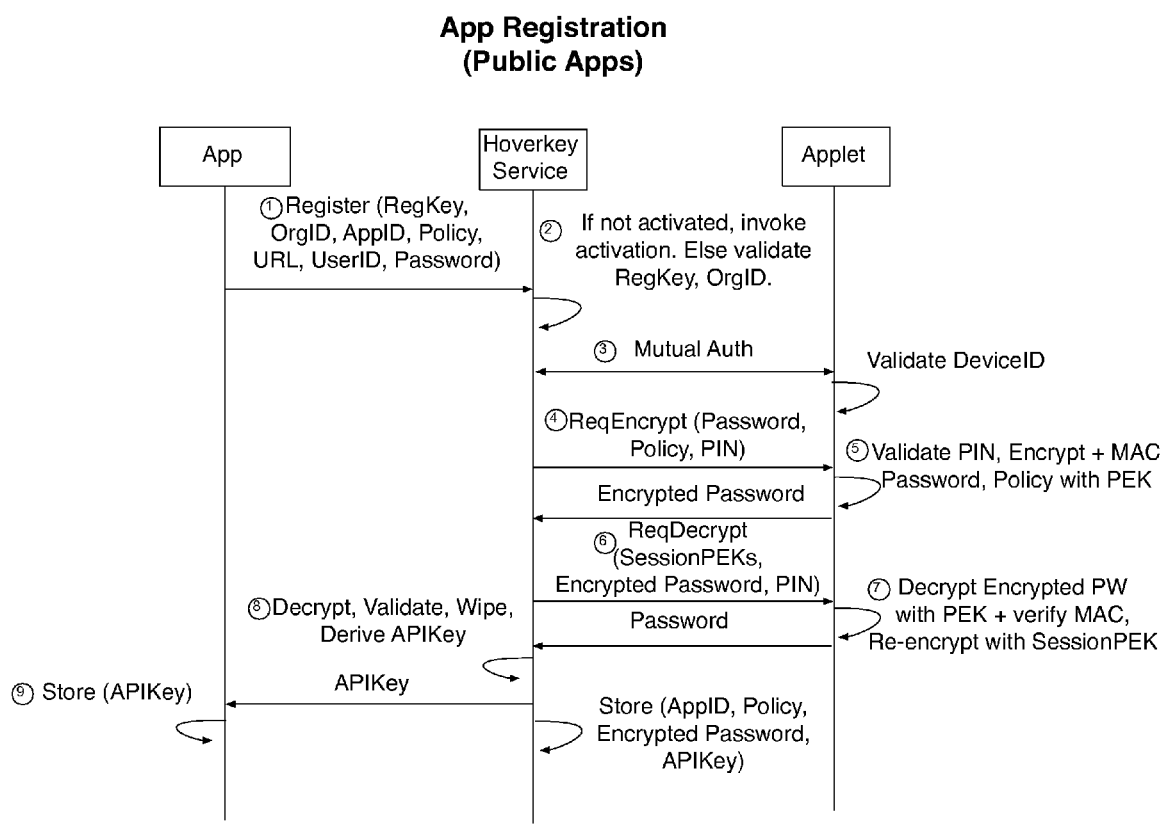
Figure 6:
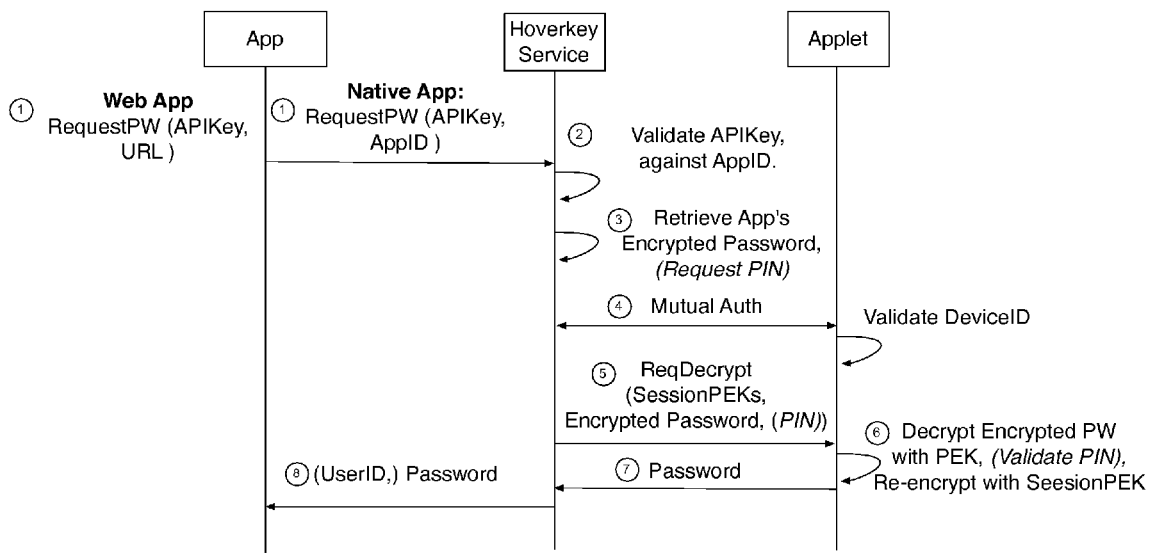
Figure 7:
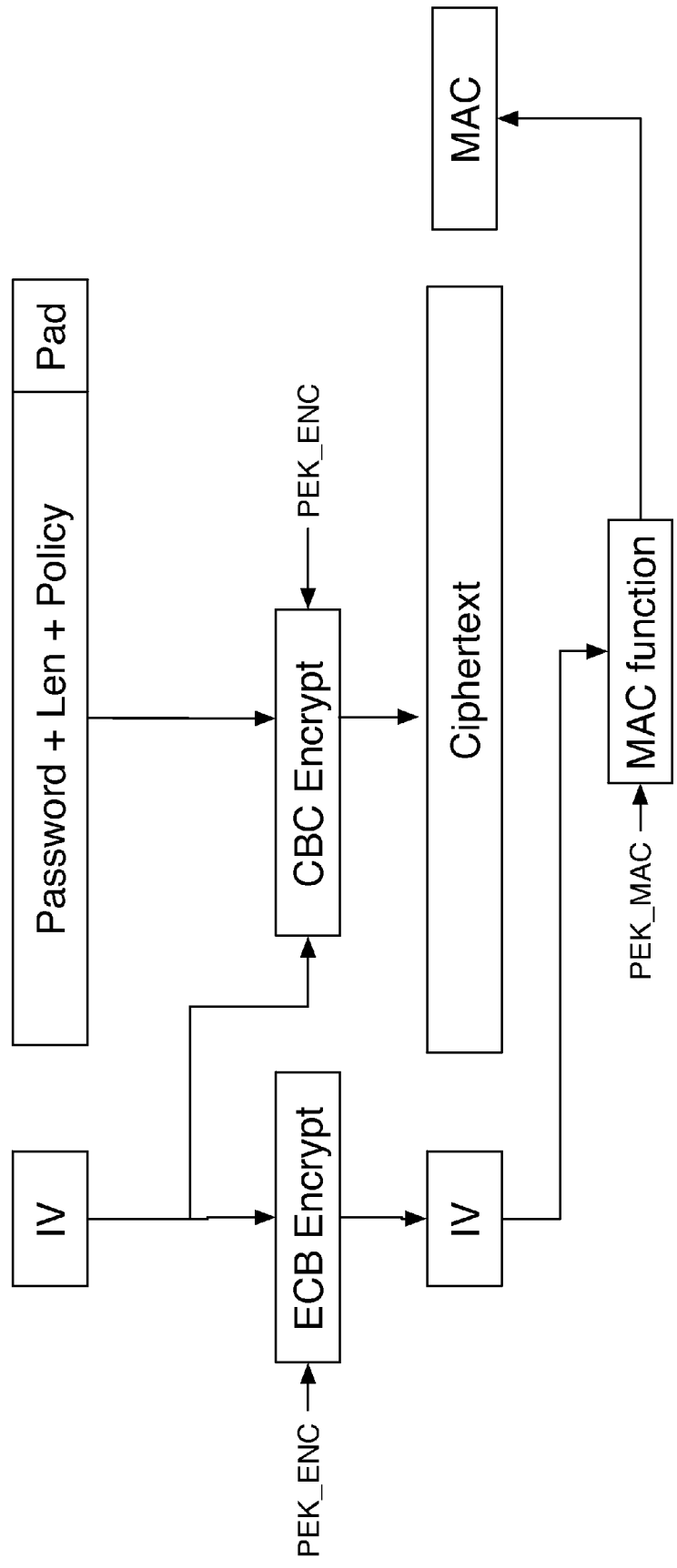
Figure 8:
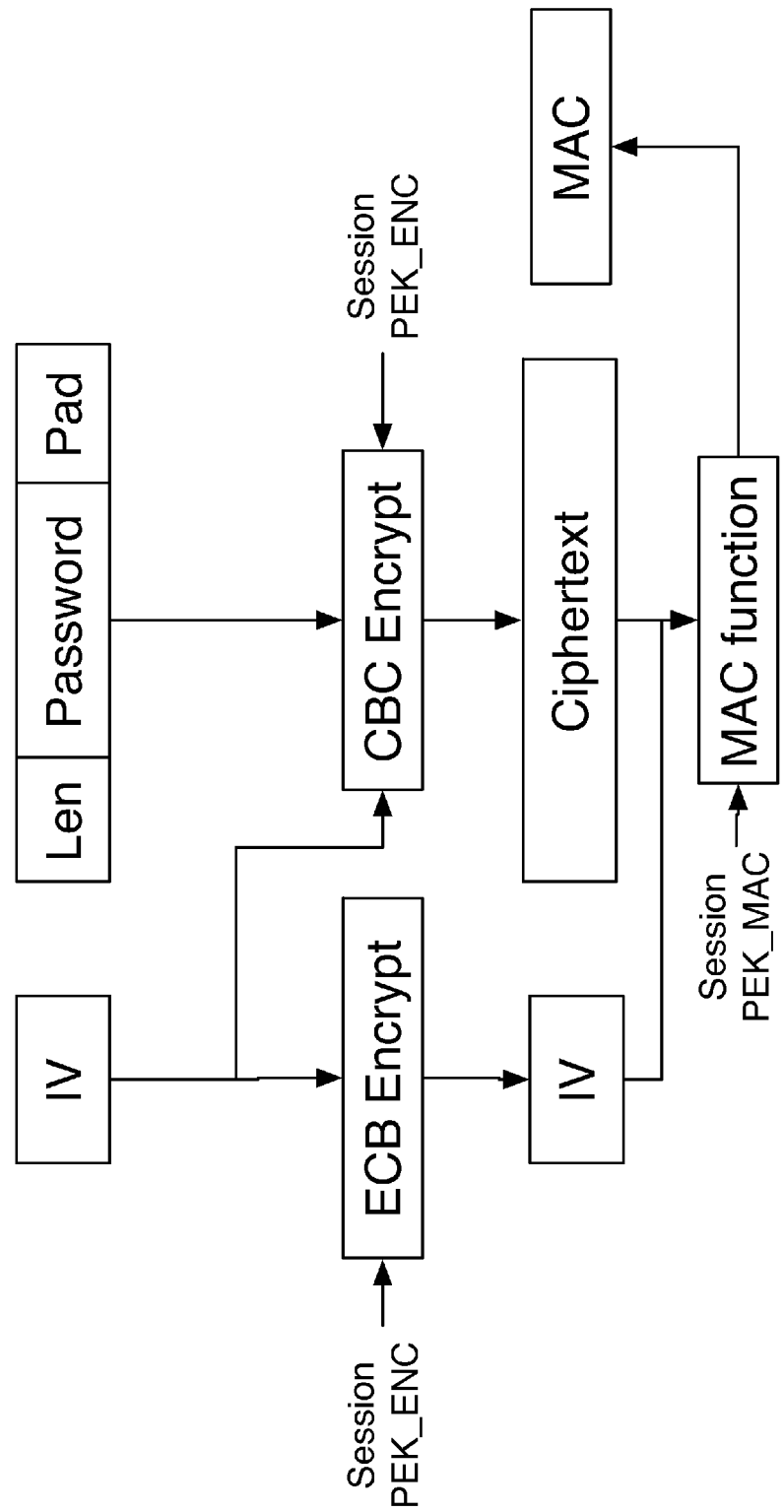
Figure 9:
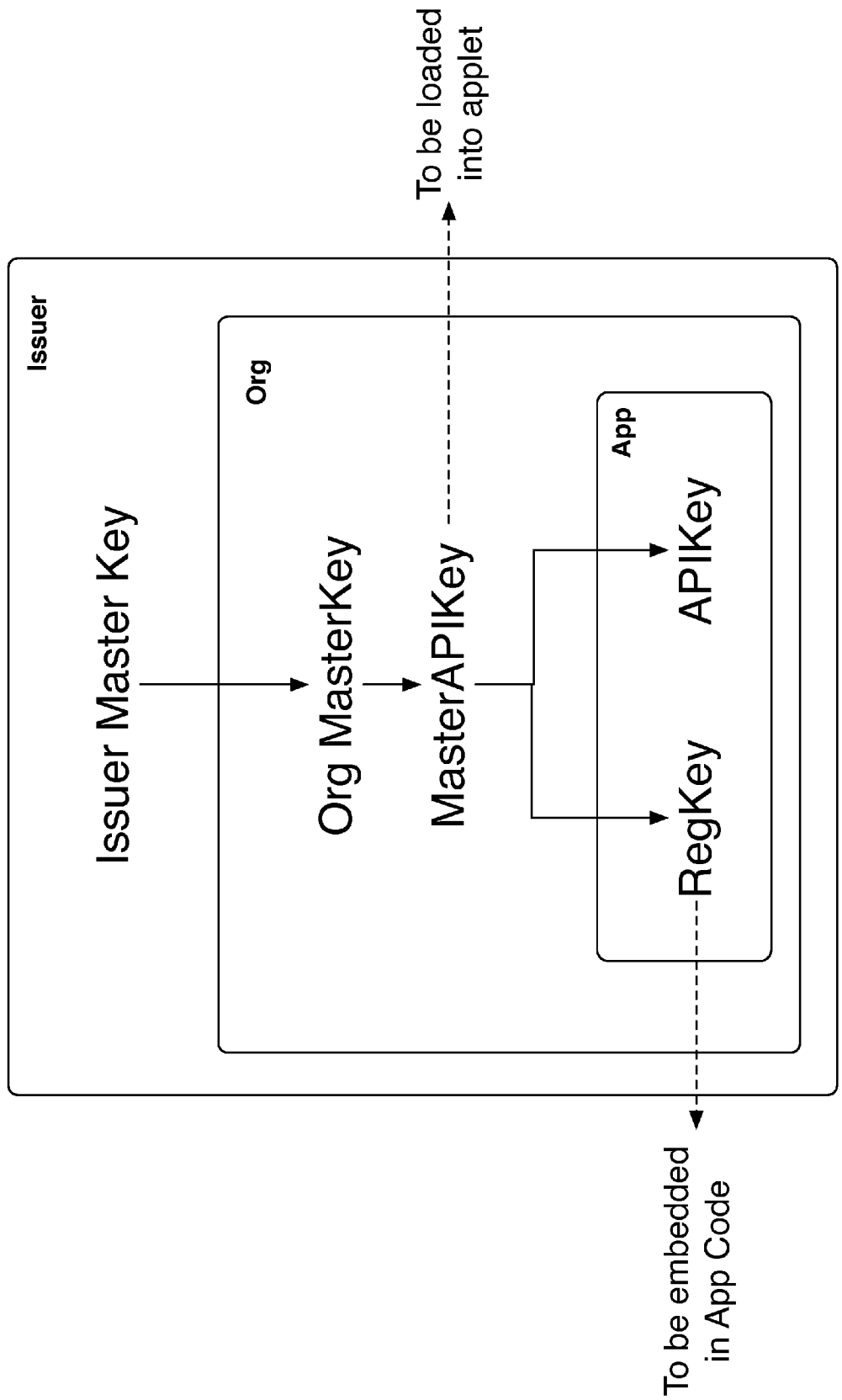

FIG. 5*a* shows the registration protocol for a private app web app;

FIG. 5*b* shows the registration protocol for a public app;

FIG. 6 shows the password access protocol;

FIG. 7 shows the password encryption process;

FIG. 8 shows password retrieval encryption;

FIG. 9 shows the key hierarchy; and

Figure 10:
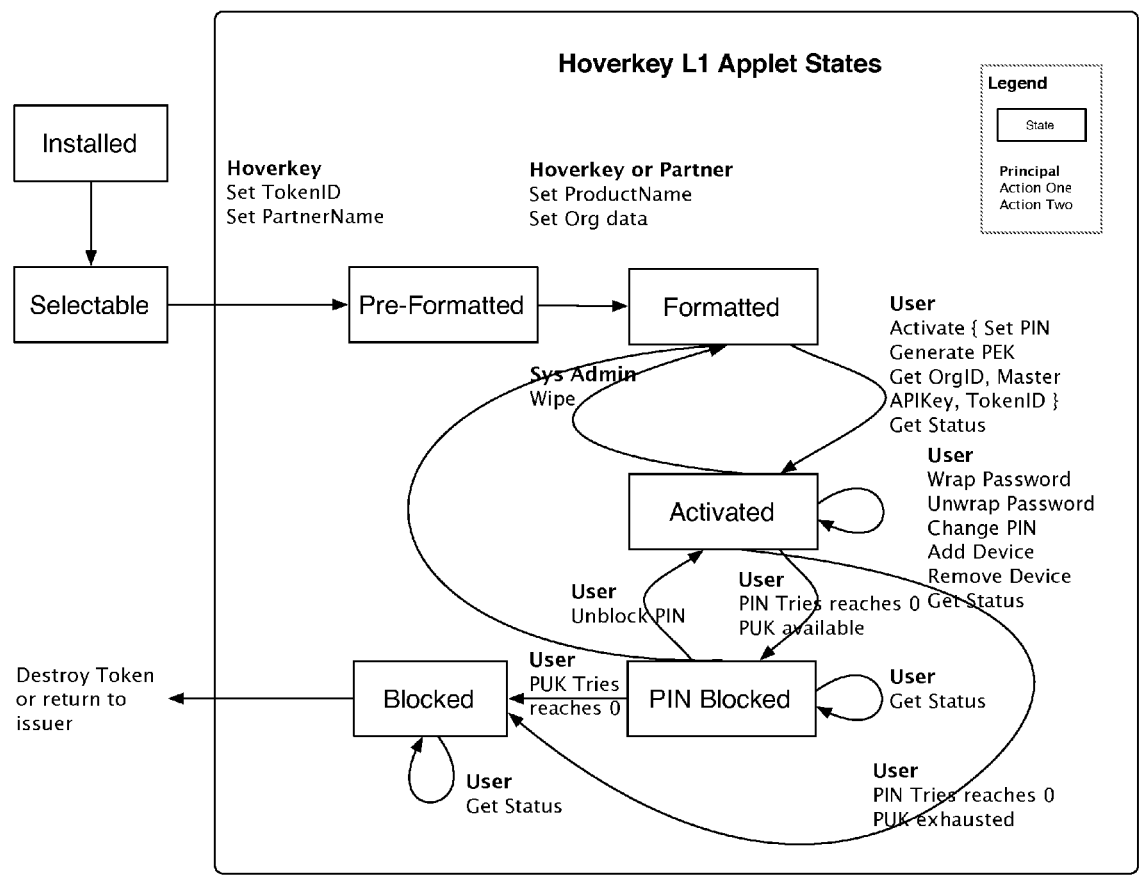

FIG. 10 shows the applet states, and their sequencing.

3.1 Deployment Model

At a high level, the preferred Hoverkey deployment model is summarised below:

Each User has one or more NFC-enabled mobile device, which may be provided by company or owned by User.

Each User is issued with a unique NFC security token.

Each NFC token may be paired with all devices belonging to the same User.

The following steps are taken in deploying a Hoverkey:

Hoverkey purchases blank NFC tokens from resellers

Upon receipt of trial or purchase order, Hoverkey formats NFC tokens for the Customer or a partner issuer Upon receipt of the NFC token, the User invokes the activation function The User then configure their Hoverkey-enabled apps with their credentials

3.2 Architecture

Figure 1:
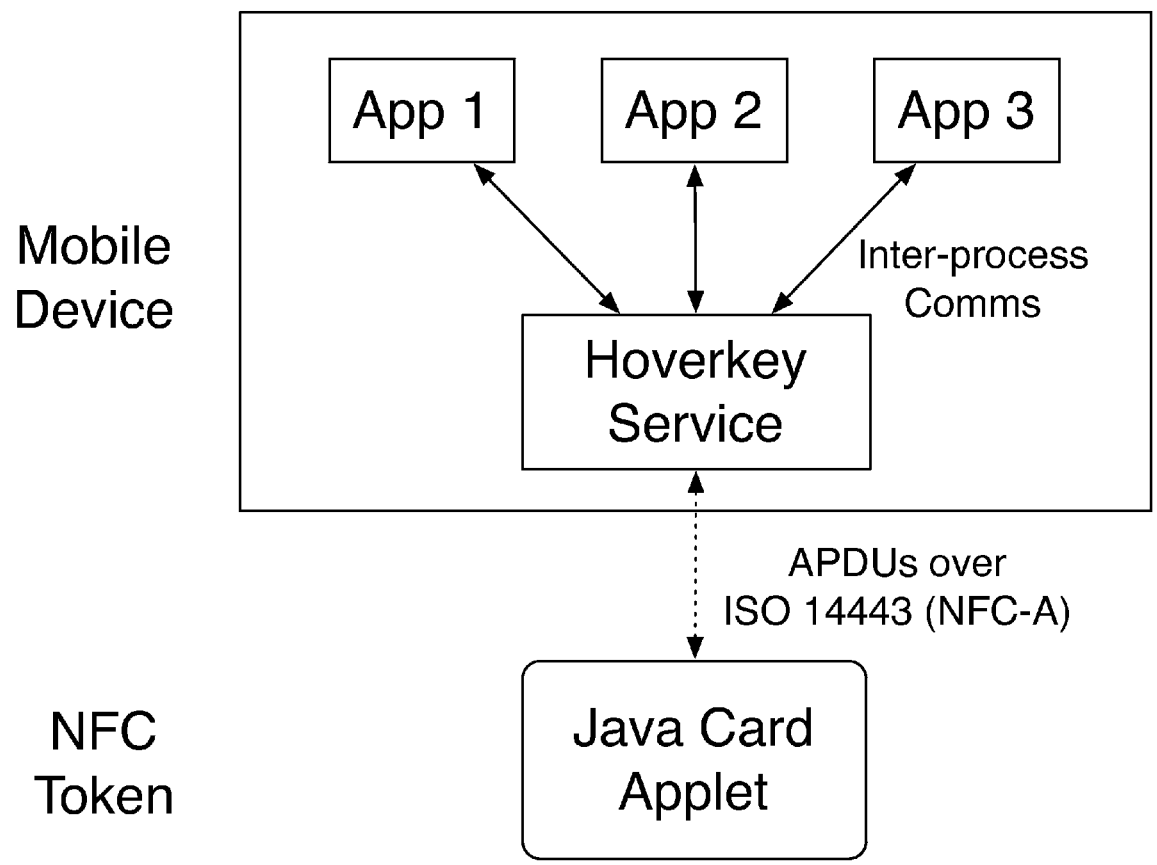
FIG. 1 shows the Hoverkey L1 high level architecture.

The high level architecture of Hoverkey L1 is illustrated in FIG. 1. Each Developer App (App 1, App 2 and App 3 in the diagram) are embedded with the Hoverkey L1 Component, which allows it to communicate with the Hoverkey Service via an inter-process communication (IPC) protocol.

On each mobile device, there is a single instance of Hoverkey Service which accepts requests from an App and when a password is required. Hoverkey Service retrieves the password on behalf of the App through a series of exchanges with the Java Card applet via the NFC interface.

The advantages of using a service include:

Removes the need share authentication keys (for Applet access) between Apps

No need for Apps to require NFC permissions

Centralised, mediated access to Applet which makes it possible to prevent concurrent access.

On the Android platform, possible IPC mechanisms include the Intent method for simple, coarse grained integration, or the Remote Service method using Android Interface Definition Language (AIDL) for fine-grained, lower-level integration.

Hoverkey-protected passwords are encrypted by the card Applet at registration and stored on the mobile device within the Hoverkey App. When access is required, the registered App requests the password via the Hoverkey App, which in turns requests the password be decrypted by the Applet.

3.3 Main Security Design Features

Activation and Pairing: A Hoverkey token can only be used with a device with which it has been paired (at activation). Each mobile device many only be paired with one token. Each token may be paired with up to four devices.

Registration: To defend against malicious apps, third-party apps may only use Hoverkey services after a secure on-device registration process. Subsequent password access requires proof of previous registration.

Two-Factor: Each password may additionally protected with a user chosen PIN to provide a form of two-factor authentication. Three or more levels of authentication may optionally be provided.

Cryptographic security: Hoverkey uses industry-standard cryptographic algorithms and modes for protection of user passwords, supported by best practices in secure key management.

Token Security: Hoverkey token are security-managed throughout their lifecycle to ensure the risks are minimized at all stages.

3.4 Using Hoverkey L1

To use Hoverkey L1, the following steps are followed:
1. New Customer organization orders Hoverkey L1 Cards for their mobile users
2. Hoverkey (or Partner) generates an OrgID for the customer.
   a) Optionally, a RegKey is generated for the customer if they intend to develop their own private Apps, which is delivered the Customer or Developer for embedding into their Apps.
3. Hoverkey formats the required number of cards with OrgID, MasterAPIKey, Admin Key, User Authentication Key and PUKs, and send them to Customer or Developer.
4. Customer development team embeds Hoverkey Component into their own App(s) and configure them with their OrgID and RegKey during development
5. User installs Customer or Developer App(s) and Hoverkey App (from Google Play Store)
6. User receives (formatted) token from Sys Admin and activation email (containing an activation URL)
7. User activates token from within Hoverkey App and sets a PIN
   a) The Hoverkey App downloads a configuration profile file
   b) User is reminded to delete activation email when activation completes
8. Third-party Apps register themselves with Hoverkey App (typically with a user name and password-once for each Customer or Developer App)
9. User starts to use Hoverkey-enabled mobile Apps
10. User may pair additional devices to the token up to four devices.
    a) If a Hoverkey server is used, App data may be synchronized from the server
    b) All Hoverkey-enabled Apps must be re-registered on the new device (as per Step 8).

4. SYSTEM COMPONENTS

4.1 Mobile Device

Hoverkey L1 is preferably supported on NFC-enabled Android smartphones, although other platforms are of course equally possible.

4.2 Hoverkey L1 App

The following subsections summaries the functions provided by the Hoverkey L1 App.Token activation
  a) Pairing of NFC token with mobile device
  b) PIN settingToken management
  c) PIN changing
  d) PIN unblocking
  e) Revoking a token
2. App registration—setting user name and password
3. App management
a) Changing password
b) De-register an App

4.3 Third-Party Mobile Apps

Embed Hoverkey L1 Component according to implementation guidelines

4.4 NFC Token

Figure 2:
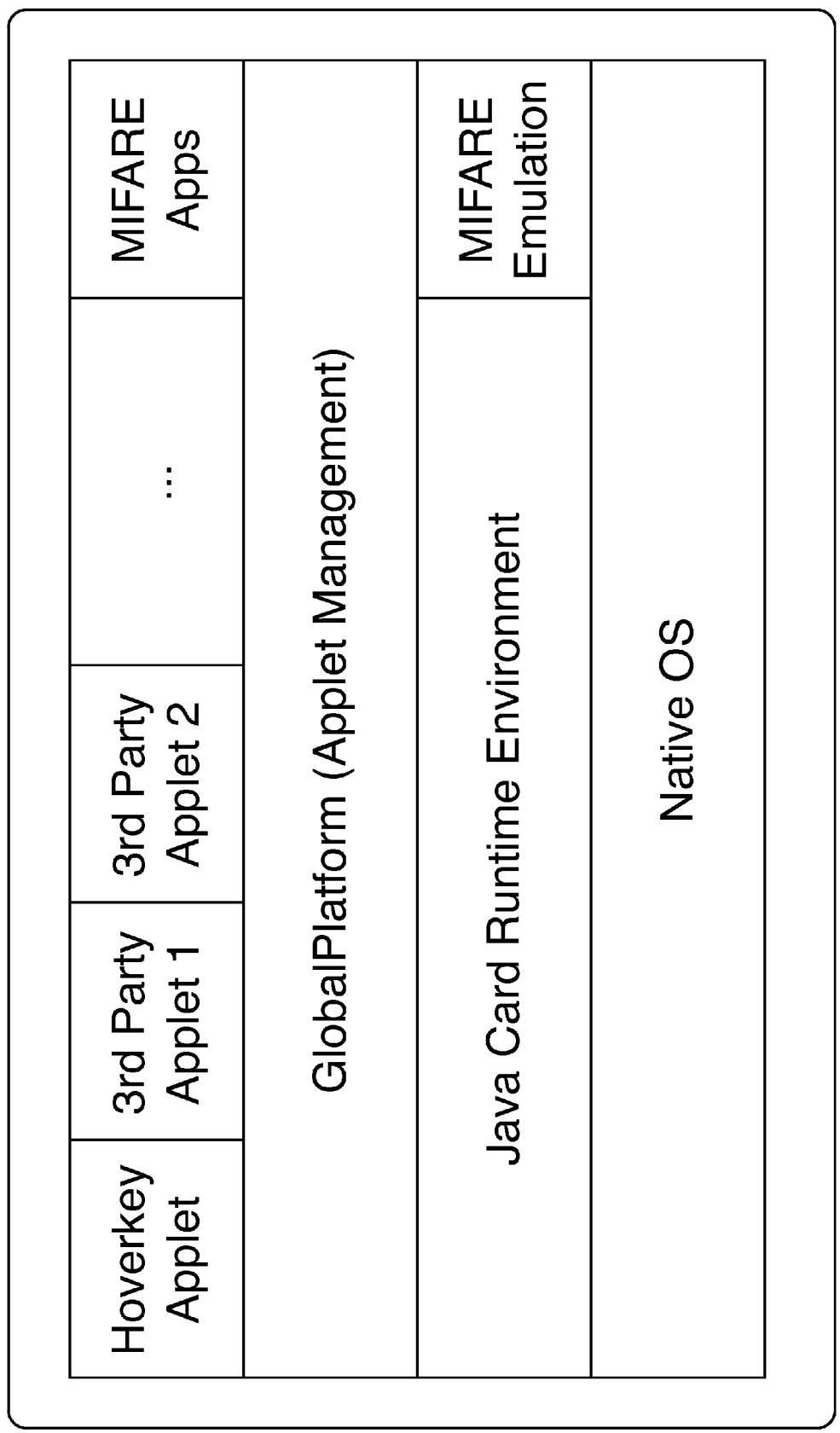
FIG. 2 shows the organization of the Java card and the applets

FIG. 2 shows the organization of the Java cord and the applets.

The NFC token is a contactless token which supports Java Card and GlobalPlatform specifications. The token preferably has a high level of security approval under the Common Criteria and/or FIPS schemes. The initial product is implemented in the ISO 7810 (credit card) form factor.

The token is designed to support multiple Java Card applets. The Hoverkey system require one applet to be installed, leaving space on the card for third-party applets.

4.5 Cloud-Based Data Storage Service

Hoverkey supports on-demand credential retrieval and synchronisation using a cloud base storage service. There are many possible implementations of a cloud service using a variety of protocols and indeed many already exist. At the minimum, a suitable service preferably supports the following functions:
1. Identifying a user with a unique identifier
2. Storage of arbitrary data on the server in an arbitrarily named file and directory
3. Retrieval of previously stored data A more preferable implementation of a Hoverkey credential storage service also provides:
1. Strong authentication of the user
2. Communication with the user device over a secure channel
3. High availability measures
4. Secure facilities management In practice, Hoverkey can support popular cloud services such as DropBox or may provide its own bespoke service for Hoverkey users.

4.5.1 Hoverkey L1 Applet

The applet implements:
The activation process (also known as "personalization" in common smart card terminology) which includes:
  Device/token pairing
  Password Encryption Key (PEK) generation
  Initial User PIN setting
Password encryption/decryption functions
The cryptographic mutual authentication protocol The Hoverkey Applet stores and manages the following data objects:

| Name/Label | Description |
| --- | --- |
| TokenID | A unique identifier for each applet installation |
| DeviceIDs | A list of (up to 4) DeviceIDs associated with this card - the ID should support ASCII text e.g. "GalaxyS3-894579", "DavesTablet-9792234" (so that when the IDs are listed, user can tell which ID corresponds to which device). |
| Password Encryption Key (PEK) | Derived from random values, the keys for encrypting and decrypting User's App passwords, as well as their integrity protection and verification |
| User PIN | The User's PIN used for accessing passwords. It is always set during activation, but each App may decide whether if a PIN is required. The PIN has an associated PIN Tries Remaining counter. |
| User PUKs | The User's PIN Unblock Keys. There is also a single Unlock Tries Remaining counter. |
| Logs | Activity logs for recent auditable events |
| OrgID | A unique identifier for Customer or Developer organization |
| MasterAPIKey | A unique key associated with the OrgID for authentication of private third-party Apps |

4.5.2 Token Lifecycle

The following outlines the lifecycle of an NFC token:
1. Reseller supplies cards to Hoverkey
2. Card formatting
   a) Low-volume deployments: Hoverkey formats cards and supplies to Customer or Developer.
   b) High-volume deployments: Hoverkey provides to a trusted third party card printer:
      Card overlay graphics
      OrgID, MasterAPIKey and AdminKey
      Set of Authentication keys and PUKs 3. User activates card
4. Activated token is:
   a) Revoked and replaced when lost or stolen
   b) Returned and replaced if becomes defective
   c) Returned when User leaves Customer organization
   d) Updated or replaced when a new applet or a new version of the existing applet are available for the User

5. HIGH LEVEL SECURITY DESIGN 5.1 Overview

The Hoverkey L1 App may be downloaded by the User from the Google Play Store and therefore does not have any Customer specific information at installation.

NFC tokens are formatted by Hoverkey which includes loading of Customer data. Upon activation, this data is transferred across to the Hoverkey L1 App to allow Developer Apps to be registered.

Developer Apps need to be registered with the Hoverkey Service (part of the Hoverkey L1 App) prior to becoming NFC-enabled. Registration involves securing the user's password with his (activated) NFC token.

5.2 Password Encryption

The core function of Hoverkey L1 is to provide secure password storage and retrieval. The password is encrypted and integrity protected alongside its metadata. When the password is required, the PEK stored in the NFC token is used to verify decrypt the protected passwords.

5.3 Secure Messaging over NFC

The Global Platform (GP) specification supports secure exchange of APDU messages between the card and the terminal. GP supports three levels of messaging security:
1. Entity authentication only
2. (1) above plus integrity protection
3. (2) above plus confidentiality protection.

Hoverkey L1 supports at secure level 3 messaging using the GP Secure Channel Protocol version 2 (SCPO2).

5.4 PIN

In order to support an enhanced level of security, Hoverkey L1 supports the additional use of a PIN which is shared by all third-party Apps (as it is a PIN validated within token applet). The user is required to set up a PIN at activation, but each third-party App may have their own policy on where a PIN is required for access.

The Sys Admin can enforce the requirement for a user PIN code (for all Apps) at activation via the configuration process.

6. SECURITY PROTOCOLS AND PROCEDURES 6.1 Activation

Figure 3:
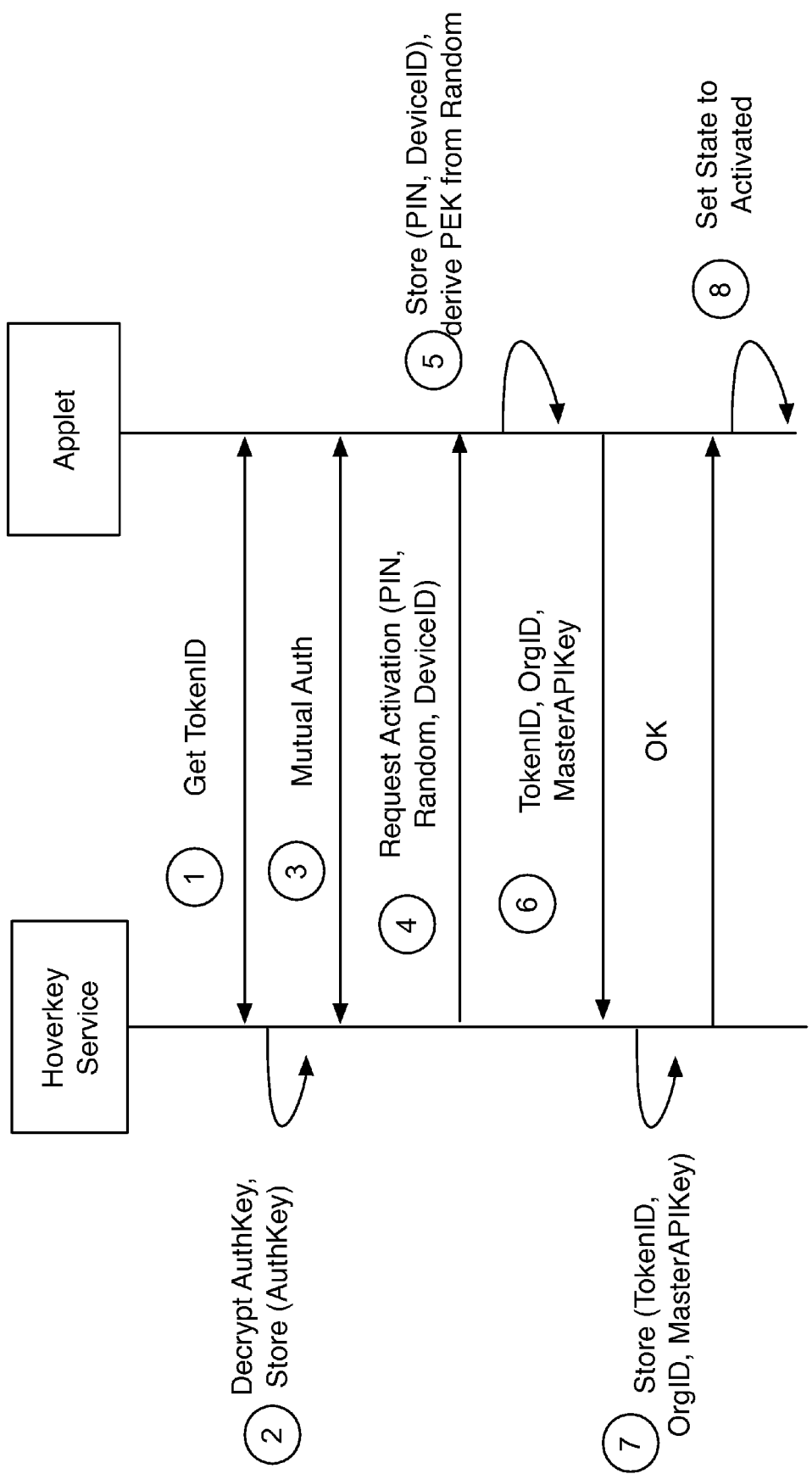
FIG. 3 shows the activation protocol.

FIG. 3 shows the activation protocol

Pre-Conditions

AuthKey (plain or obfuscated) obtained from activation URL

Configuration data downloaded to Hoverkey Service via activation URL including:PIN requirement policies
   Co-branding data
   Report configuration Applet is formatted with OrgID and MasterAPIKey and has not been activated Goals Establish a shared authentication (pairing) key between Applet and Hoverkey Service Generate and store Password Encryption Key (PEK) on token Initialize User PIN Transfer OrgID and MasterAPIKey to Hoverkey Service (for validation of Developer Apps)

Steps (referring to the corresponding numbers set out in FIG. 3).

1. Hoverkey Service queries token for TokenID
2. The AuthKey may be supplied in plaintext, or, for enhanced security, obfuscated with the TokenID.
   a) If obfuscated, Hoverkey Service de-obfuscates (decrypts) AuthKey with TokenID (as shown in FIG. 3)
   b) If in plaintext, Step 1 is omitted and Step 2 will only need to store the (plaintext) AuthKey
3. Service and Applet perform mutual authentication
4. Service sends activation request, supplying a random number, PIN and DeviceID
5. Applet stores PIN and DeviceID, and derives PEK from Random
6. Applet returns TokenID, OrgID and MasterAPIKey. These are stored by Hoverkey Service, along with RegKey after deriving from MasterAPIKey.
7. Service returns OK
8. Applet updates its status to Activated
9. Upon activation success, if the user has no more devices to pair with his token, he should delete the activation email (and any copies) from his mail account.

6.2 Adding a New Device

Figure 4:
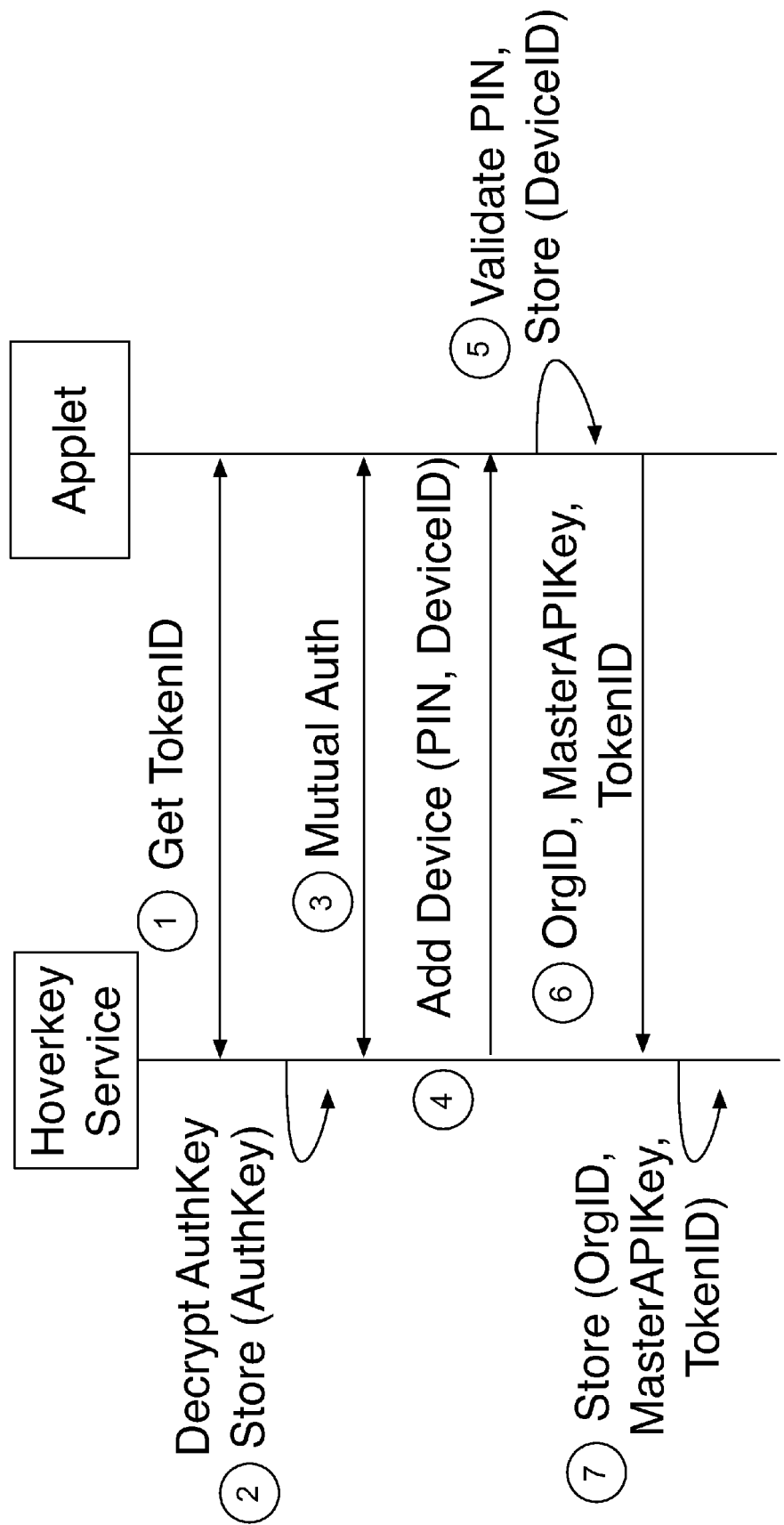
FIG. 4 shows the method of adding a new device to an activated card.

FIG. 4 shows the method of adding a new device to an activated token.

Pre-Conditions

Applet has already been activated (by another device)

Goal

Transfer OrgID and APIKey to Hoverkey Service

Steps (referring to the corresponding numbers set out in FIG. 4)

1. Hoverkey Service retrieves AuthKey from link provided by activation email
2. Service mutually authenticates with (already activated) Applet
3. Service supplies a PIN to authenticate to Applet, along with its own DeviceID to be added
4. Applet validates PIN, stores DeviceID
5. Applet returns OrgID, MasterAPIKey and TokenID
6. Service stores OrgID and APIKey, along with RegKey after deriving from MasterAPIKey.
7. Upon activation success, if the user has no more devices to add to (pair with) his token, he should delete the activation email (and any copies) from his mail account.

6.3 App Registration

The purpose of registration is for the third-party app to authenticate itself to the Hoverkey App, and at the same time to provide Hoverkey App with the user credentials for their secure storage.

Upon successful registration, Hoverkey issues the third-party app with its unique random APIKey for its subsequent Hoverkey API access (i.e. an APIKey even if compromised will be invalid on a different device).

There are two methods for app registration:
1. Asymmetric key method, primarily for public apps, i.e. those available from the App stores.
2. Symmetric key method, primarily for private apps, i.e. those developed in-house and distributed by non-public means.

Asymmetric Key Method

A public app developer wishing to integrate Hoverkey into their app must obtain a Registration Key (RegKey) in the form a certificate, which is embedded into the app prior to its public release. The certificate is issued by Hoverkey and signed with the Hoverkey private key. The corresponding public key is embedded in the Hoverkey App for verification of the app certificate. The idea is that the certificate attests to various attributes of the app (which need to be independently obtainable from the OS), thereby making it difficult for a malicious app to masquerade as genuine.

Attributes to be certified include (for Android app):

Its unique AppID (Package Name on Android whose uniqueness is guaranteed if downloaded from Play Store)

Symmetric Key Method

A private app, i.e. one not deployed through the public app store will employ a different registration scheme. Since the app developer may want to deploy their apps privately without Hoverkey involvement, we employ an alternative method which allows the developer to generate their own RegKey (based on symmetric keys).

FIG. 5 shows the registration protocol. FIG. 5a illustrates registration for a private app web app, and FIG. 5b illustrates registration for a public app. The same reference number apply to each.

Precondition

NFC Token has been successfully activated (if not activation will be invoked at Step 2)

Goals

Set up Hoverkey Service for use with this App

Create NFC-token-protected password with for use with Hoverkey Service

Steps (referring to the numbers set out in FIGS. 5a and 5b)

1. App registers itself with OrgID (private app only), APIKey, AppID, Policy and the User's password. In the case of a public app, the RegKey will be a digitally signed certificate. For a private app, the RegKey will be a pseudorandom byte string. Currently supported policies include:
    a) Whether PIN required for this App
2. Hoverkey Service checks whether it has been activated. If activated, it validates the RegKey supplied by the app. For a public app, the RegKey is validated by the Hovkery App Reg Public Key. For a private app, the provided OrgID is checked and RegKey validated against that derived from MasterAPIKey.
3. Service performs mutual authentication with Applet. In addition, Applet validates the DeviceID supplied by Service.
4. Service sends request for password to be encrypted, along with policy and PIN for validation.
5. Applet validates PIN and encrypts the password and policy with the PEK
6. In order to validate successful encryption, Service sends a decryption request with the encrypted password, supplying a the Session PEKs (Session PEK_ENC and Session PEK_MAC) and optionally a PIN (as per policy).
7. Applet decrypts and returns the plaintext password, encrypted under the SessionPEK.
8. Service decrypts and verifies the plaintext password returned and returns success to the App.
9. Service saves the UserID, Policy and the encrypted password on the cloud storage server as AppID/DeviceID/credentials.dat.

6.4 Password Retrieval

FIG. 6 shows the password access protocol.

Precondition

App has registered itself with the Hoverkey Service and set up an encrypted password The Applet is in Activated state Goal Retrieves the specified password that has been protected by the NFC token Optionally, retrieves user ID (if stored)

Steps (referring to the number set out in FIG. 6)

1. App sends request password command, supplying APIKey, AppID.
2. Hoverkey Service validates the request
3. Service obtains the App's UserID, Policy and encrypted password by retrieving the file AppID/DeviceID/credentials.dat from the cloud storage, then requests a PIN from user if required by Policy.
4. Service mutually authenticates with Applet. In addition, Applet validates the DeviceID supplied by Service.
5. Service sends the encrypted password to Applet for decryption, supplying session keys (Session PEK_ENC and Session PEK_MAC), and optionally a PIN (as per policy).
6. Applet authenticates and decrypts the input, and validates the PIN if required.
7. Applet returns the plaintext password encrypted under the Session PEK and integrity protected with Session PEK_MAC
8. The password is decrypted and returned to the App.

6.5 Changing Password for App

To change the password for an App, Hoverkey services simply replaces the existing encrypted password with a new one, with the following steps:

1. Mutual authentication, Applet validates DeviceID
2. Requires PIN
3. Service sends new password and policy
4. Applet returns encrypted password 6.6 Changing PIN To change the token PIN, the following steps are followed:

1. Mutual authentication, Applet validates DeviceID
2. Requires old PIN,
3. User enters new PIN (twice)
4. Applet stores new PIN 6.7 Deregister App Remove the following information for the App: (Hoverkey token not required)

1. AppID
2. Any encrypted password(s)
3. Any saved user name(s)
4. Policy 6.8 Revoking NFC Token If the token is lost, perform once by each associated device: (The Hoverkey token not required)

Wipe authentication key from Hoverkey App

Wipe all encrypted passwords

Reset Hoverkey app to pre-activated state

The Hoverkey App also downloads a list of revoked Token IDs periodically, which allows it to revoke the token if an entry matches the one that it is paired with.

6.9 List Devices

Can be performed
  by any paired device
    mutual auth, Applet validates DeviceID, or mutual auth with Admin Key
  Or after mutual auth with Admin Key No PIN required Applet returns list of associated Device IDs 6.10 Revoking a Device Usually takes place after List Devices—as Hoverkey App is not expected to remember the device ID list Can be performed from any paired device Mutual auth, Applet validates DeviceID Requires PIN Removes DeviceID from Applet 6.11 PIN Blocking Within the Applet, the User PIN has an associated PIN Tries Remaining (PTR) value, initialized to a specified number.

The Applet also has a fixed number (5) Personal Unblocking Keys (PUK) of 8 digits, labelled PUK1, PUK2 etc, which are randomly generated and loaded at formatting. A copy of the PUKs for each token is provided to the Sys Admin. The Applet maintains a single Unblocking Tries Remaining (UTR) value, initialized to a specified number.

Each time the PIN is successfully validated, PTR is reset to its initial value.

Each time an incorrect PIN is detected, PTR is decremented by one.

If PTR reaches zero, the User PIN is blocked. The Applet also returns to the Service which PUK the user should use to unblock the PIN, and tries remaining for that PUK.

In order to unblock and reset the PIN, the user must request his PUK code from SysAdmin as indicated by within PIN blocked UI or by retrieving applet status (see Section 0). If this is the first time the User unblocks the PIN, he will request the PUK1 code; the second time will require PUK2 etc., i.e. each PUK code can only be used once.

If the User's PUK codes are exhausted, as soon as PTR reaches zero again, the Applet is blocked. The NFC token must be replaced.

Each time a PUK is entered incorrectly, the UTR is decremented. If UTR reaches zero, the Applet is blocked. The NFC token must be replaced.

6.12 Get Applet Status

Can be performed from any device

If not authenticated

Applet returns TokenID, Applet State

If authenticated (with Auth Key or Admin Key)

If in Formatted State: returns TokenID, Applet State, PIN Tries Remaining Counter=Max, current PUK index, current PUK Tries Remaining counter. (this may not be max since applet may have been reset to formatted, which does not reset PUK status, i.e. used PUKs remains used). The current PUK index is the index of the PUK code the use should ask for if the current PIN becomes blocked.

If in Activated State: returns TokenID, Applet State, PIN Tries Remaining Counter, current PUK index, PUK Tries Remaining counter=Max If in PIN Blocked State: returns TokenID, Applet State, PIN Tries Remaining Counter=0, current PUK index, PUK Tries Remaining counter If in Blocked State: returns TokenID=0, Applet State 6.13 Admin Functions All functions within this section require mutual authentication with Admin Key.

6.13.1 Reformat Token

In order to re-format the token (e.g. for issuing to a new user)

Mutual auth with Admin Key

Send reformat command to:
  Remove existing User PIN (and reset retry counter)
  Remove existing password protection keys PEK_ENC, PEK_MAC
  Reset applet to FORMATTED state
  (Does not reset PUKs—used PUKs remains used)

6.13.2 PIN Reset

In order for the Sys Admin to reset the PIN,

Mutual auth with Admin Key

Send PIN reset command with the user's new PIN
  (Does not require PUK)

6.14 Emergency Access 6.14.1 Lost/Defective NFC Token

For emergency online access, the user may simply login manually with his password. If the user does not know/remember his password (due to the use of a complex password, for example), the application's password reset facility may be used to set a new password (and also change the Hoverkey protected password).

6.14.2 Forgotten/Blocked PIN

If an App's policy requires a PIN which the User does not remember, he could:

Try different PINs until PIN Blocked (if not already) and request a PUK from the Sys Admin to Unblock and reset the PIN, Log in manually if he remembers the user ID and password (although he will have to either recall or reset the PIN eventually to continue using Hoverkey L).

6.15 Synchronising Credentials Between Devices

Preconditions:

User has devices with IDs DeviceA and DeviceB respectively

The user's token has been activated and ready for use for both devices

The user has registered an app with an ID AppX on DeviceA

AppX has not been registered on DeviceB

Goal:

AppX credentials for the user becomes available for use on DeviceB

Steps

1. On DeviceB, AppX registers itself with Hoverkey Service using either the symmetric key or asymmetric key method, but without supplying the user's credentials.
2. Service retrieves the file AppX/DeviceA/credentials.dat from the cloud storage
3. Service uploads the same file, unaltered, as AppX/DeviceB/credentials.dat
4. The credentials are now ready for use on DeviceB

7. CRYPTOGRAPHIC SPECIFICATION 7.1 Key Management

For security purposes, keys used for encrypting and integrity-protecting user passwords for storage (generated by the applet at activation) never leave the applet (nor the physical token). Session keys are also used (generated by the Hoverkey App) for encrypting and integrity-protecting passwords over NFC after decryption. These are wiped immediately after use.

7.2 Password Storage Encryption Process

FIG. 7 shows the password encryption process.

Encrypting password for storage, to be performed by the applet.

a) Combine policy, length of password and password itself received from device, apply padding to align with encryption block length 2. Generate a random Initialization Vector (IV) of encryption cipher block length
3. Encrypt block generated in Step 1 in CBC mode using IV from Step 2, using Key PEK_ENC
4. Encrypt the IV with PEK_ENC in ECB mode
5. Calculate a MAC on (output from Step 4+output from Step 3) using a hash based MAC (HMAC) with the key PEK_MAC
6. (Output from Step 5+output from Step 3+MAC from step 4) is returned to device for storage 7.3 Password Retrieval (Session) Encryption Process FIG. 8 shows password retrieval encryption.

To be performed by applet, after verification of the MAC, decryption of the encrypted object supplied by device, and validation of the policy field.

1. The plaintext password is left padded with a two-byte length field, and right padded with random bytes to make the largest allowable block (fits within an R-APDU) whose size is a multiple of the cipher block length
2. Steps 2-5 as per the Password Storage Encryption Process, except that Session_PEK_ENC and Session_PEK_MAC are used for encryption and integrity protection instead.

7.4 App Registration Key Derivation Hierarchy (Symmetric Key)

FIG. 9 shows the key hierarchy. Keys are derived using the HMAC-Based KDF with as described in NIST Special Publication 800-108, [: L. Chen, *Recommendation for Key Derivation Using Pseudorandom Functions* (Revised), NIST SP 800-108, October 2009, available from http://csrc.nist.gov/publications/nistpubs/800-108/sp800-08.pdf. This document is incorporated by reference.

Issuer Keys
 IssuerMasterKey=Random bytes generated by secure RNG
 Org Keys
OrgID=Assigned unique OrgID
AppID=(globally) unique app identifier

8. HOVERKEY APPLET STATUS

FIG. 10 illustrates the applet statuses, and their sequencing.

| State | Description |
|---|---|
| Installed | Applet is installed but not yet selectable |
| Selectable | Applet is now selectable and now ready to be personalized. |
| Formatted | Personalization step 1: Hoverkey (or a trusted third-party) has generated and loaded OrgID, APIKey, Auth Key, Admin Key and PUKs. Admin may reset activated cards to this state. All data objects are reset except for any PUKs that have been used. |
| Activated | Personalization step 2: Token delivered to User who has also received his personalized activation email. He has followed the instructions to activate the token and set the PIN. The Applet is now ready to be used operationally. Additional devices may be added at this point. |
| PIN Blocked | If the User's PIN tries remaining counter reaches zero (with at least one unused PUK remaining), the Applet enters this state and will not perform the core functions until it's unblocked with a PUK |
| Blocked | If PUK tries counter reaches zero or PIN tries counter reaches zero with no more PUK remaining, the Applet becomes locked. The token must be revoked, then it may be destroyed or sent back to Hoverkey |

9. GLOSSARY

| Term | Definition |
|---|---|
| Applet | Software program running on a smart card supporting Global Platform and card (e.g. Java Card) specifications |
| Application Protocol Data Unit (APDU) | Basic communication messages between a smart card and the terminal (reader) |
| App Registration | Validation of a third party app by Hoverkey at first use and issuance of API key for subsequent access |
| Bluetooth/BLE | A set of wireless communication standards designed for short-range data exchange between devices. Typically used by small personal devices to create a Personal Area Network. Bluetooth Low Energy (BLE) is a Bluetooth standard which allows low-power devices which only communicate intermittently to consume a fraction of the power required by normal Bluetooth. |
| Customers | The person or organization responsible for day-to-day management of Hoverkey tokens. In particular, they are responsible for sending out activation emails and, when a user requires PIN unblocking, authenticating the user and issuing PUK codes. When selling directly to End Users, Hoverkey will in effect play the role of the Customer. |
| Developers | Developers of mobile applications, especially those who embed Hoverkey functions into their apps |
| DeviceID | A unique identifier for a mobile device (or one that is highly likely to be unique) |
| Developer Apps | Developers may enhance the security of their existing mobile applications by creating a Developer App, using the Hoverkey iOS and Android or other types of code libraries. |
| End User (or User) | A members of a Customer organization who uses Hoverkey-enabled applications |
| Emergency Access | An optional service which allows access to Hoverkey-protected services without a functioning NFC token using a pre-specified back-up authentication method. |
| Global Platform | An organization responsible for specifying standards for smart card application (i.e. applet) management |
| Hoverkey L1 App | An application installed and run on the User's mobile device providing Hoverkey Service and management functions |
| Hoverkey Component | Software component provided by Hoverkey for integration into third-party Apps |

-continued

| Term | Definition |
|---|---|
| Issuer Partner | An organization with an established relationship with Hoverkey to issue Hoverkey tokens to their Customer |
| Personal Identification Number (PIN) | A sequence of digits which is kept secret by the user for authentication to the NFC Token |
| System Administrator (Sys Admin) | Typically the person in the Customer organization who is responsible for implementing IT security policies and will have influence over any security product that may be selected by the organization. They have a technical skillset. They may also take the role of User Administrator (see below) in small deployments. |
| Token Activation | The process by which an End User sets up the first use of his NFC token |
| Token Formatting | The process by which blank smart cards are prepared for the Customer |
| User Admins | This is the person in the Customer organization who is responsible for the operating the IT security systems. |

What is claimed is:

1. A method of authenticating access to a computer resource via a mobile device comprising:
    storing an encrypted resource authorization that is associated with access to or use of the computer resource on the mobile device, wherein the computer resource comprises an application running or stored on the mobile device, or accessible therefrom;
    transmitting the encrypted resource authorization to a separate portable security token in response to a request to access or use the application;
    on the token, decrypting the encrypted resource authorization and generating at least partially therefrom an unlock response;
    wherein the mobile device is configured to store and transmit, and the token is configured to decrypt, any of a password, PIN and cryptographic key, and wherein the token is configured to verify a PIN code on the token to authorize generation of the unlock response;
    wherein at least a portion of the unlock response comprises a decrypted password for the computer resource on the mobile device and corresponds to the encrypted resource authorization that was previously stored for that computer resource;
    securely transmitting the unlock response to the mobile device;
    requiring a user to authenticate separately on the mobile device;
    unlocking the resource if the required unlock response and the separate authentication are both valid.

2. A method as claimed in claim 1 in which the unlock response comprises a plain authorization, obtained by decrypting the encrypted resource authorization, or a function of a plain authorization, obtained by decrypting the encrypted resource authorization, and additional information.

3. A method as claimed in claim 1 in which the unlock response is transmitted to the mobile device under the protection of an encryption key, such x', comprising a session key.

4. A method as claimed in claim 1 in which the token stores user credentials, the decryption on the token being based on the user credentials.

5. A method as claimed in claim 1 in which the encrypted resource authorization is stored on the mobile device.

6. A method as claimed in claim 1 in which the encrypted resource authorization is stored in a cloud and is retrieved from the cloud to the mobile device.

7. A method as claimed in claim 1 which the authentication on the mobile device is validated on the token before the unlock response is sent.

8. A method as claimed in claim 1 including running a service on the mobile device which controls device cryptographic functions and access to the resource.

9. A method as claimed in claim 1 including running an applet on the token which provides token cryptographic functions.

10. A method as claimed in claim 4 in which the user credentials are generated by the token and never leave the token.

11. A method as claimed in claim 1, in which the encrypted resource authorization can be decrypted solely with the corresponding user credentials stored on the token.

12. A method as claimed in claim 1 including verifying integrity of the encrypted resource authorization on the token by a message authentication code received from the device.

13. A method as claimed in claim 1 in which the integrity of the encrypted resource authorization is verified on the token prior to decryption.

14. A method as claimed in claim 1 in which the device and the token perform cryptographic mutual authentication before transmission of the encrypted resource authorization.

15. A method as claimed in claim 1 in which a user secret is passed from the device to the token and is validated by the token before the decryption operation takes place.

16. A system of authenticating access to a computer resource via a mobile device with a portable security token, comprising:
    a mobile device;
    a stored encrypted authorization that is associated with access to or use of the computer resource on the mobile device, wherein the computer resource comprises an application running or stored on the mobile device, or accessible therefrom;
    a token that is portable and separate from the mobile device, and including a token communications system and a token processor providing cryptographic functions;
    and wherein in use the encrypted authorization is transmitted by the mobile device to the token in response to a request to use the application; is decrypted on the token; the token generating at least partially therefrom an unlock response, the unlock response being securely transmitted by the token communications system to the mobile device; requiring a user to authenticate separately on the mobile device; and unlocking the resource if the required unlock response and the separate authentication are both valid;

wherein at least a portion of the unlock response comprises a decrypted password for the computer resource on the mobile device and corresponds to the encrypted resource authorization that was previously stored for that computer resource;

wherein the mobile device is configured to store and transmit, and the token is configured to decrypt, any of a password, PIN and cryptographic key, and wherein the token is configured to verify a PIN code on the token to authorize generation of the unlock response.

17. A system as claimed in claim 16 in which the token comprises a token storage for storing private user credentials and wherein the decryption on the token is based on the user credentials.

18. A system as claimed in claim 16 including means for retrieving the encrypted authorization from the cloud.

19. A system as claimed in claim 16 in which the unlock response is transmitted by the token communications system to the mobile device under the protection of an encryption key such as a session key.

20. A system as claimed in claim 16 in which the token is a card.

21. A system as claimed in claim 16 in which the device communications system and the token communications system communicate over the air, or communicate when the token is placed in close proximity to or is touched to the device.

22. A system as claimed in claim 16 in which the separate authentication on the mobile device is validated on the token before the unlock response is sent.

23. A system as claimed in claim 16 in which the device communications system sends a user secret to the token which is validated by the token before the decryption operation takes place.

24. A system as claimed in claim 16 in which the device communications system sends a message authentication code (MAC) to the token, which is validated by the token before the decryption operation takes place.

25. A system as claimed in claim 16 in which the integrity of the encrypted authorization is verified on the token prior to decryption.

26. A system as claimed in claim 16 in which the device and the token are arranged to perform cryptographic mutual authentication before transmission of the encrypted authorization.

27. A system as claimed in claim 16 in which the token sends the unlock response only on positive confirmation by the user comprising pressing a button on the token.

* * * * *